(12) United States Patent
Bona et al.

(10) Patent No.: US 7,082,232 B2
(45) Date of Patent: Jul. 25, 2006

(54) OPTICAL CROSS-CONNECT SWITCH

(75) Inventors: Gian-Luca Bona, Hedingen (CH); Folkert Horst, Zurich (CH); Hugo E. Rothuizen, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 385 days.

(21) Appl. No.: 10/318,615

(22) Filed: Dec. 11, 2002

(65) Prior Publication Data

US 2003/0123787 A1 Jul. 3, 2003

(30) Foreign Application Priority Data

Dec. 24, 2001 (EP) .................... 01811267

(51) Int. Cl.
*G02B 6/26* (2006.01)
*G02B 6/42* (2006.01)

(52) U.S. Cl. ........................................ 385/17
(58) Field of Classification Search .............. 385/16, 385/17, 20–24
See application file for complete search history.

(56) References Cited

U.S. PATENT DOCUMENTS

| | | | | |
|---|---|---|---|---|
| 6,404,944 | B1 * | 6/2002 | Wa et al. | 385/22 |
| 6,549,700 | B1 * | 4/2003 | Sweatt et al. | 385/25 |
| 6,865,310 | B1 * | 3/2005 | Yokouchi | 385/16 |

* cited by examiner

Primary Examiner—Daniel Stcyr
Assistant Examiner—Jamara A. Franklin
(74) Attorney, Agent, or Firm—Keusey, Tutunjian & Bitetto, P.C.; Wan Yee Cheung, Esq.

(57) ABSTRACT

The invention is related to an optical cross-connect switch comprising a waveguide connected with one waveguide end to a first optical port and connected with its other waveguide end to a steering device for directing an optical signal beam from said first optical port to a second optical port, said waveguide comprising a patterned waveguide layer disposed on a substrate. The steering device can be arranged in a cavity in the substrate. The optical cross-connect switch then comprises a substrate, which is partially covered by a waveguide layer and a cladding layer, patterned for example by etching processes, with at least one waveguide, connected with one end to one of the optical ports and with the other end, comprising core and cladding, unsupported by the substrate or remaining layers and extending into a switching plane above the cavity, which is located in the substrate. In the cavity the steering device is arranged, designed to direct the free waveguide end in a selectable direction within the switching plane towards an optical element, such as a free end of a further waveguide, designed to receive or send optical signal beams. The optical cross-connect switch preferably comprises a slab waveguide module positioned within the switching plane in order to transfer the optical signal beams between a waveguide connected to the first set of optical ports and a waveguide of the second set of optical ports.

13 Claims, 6 Drawing Sheets

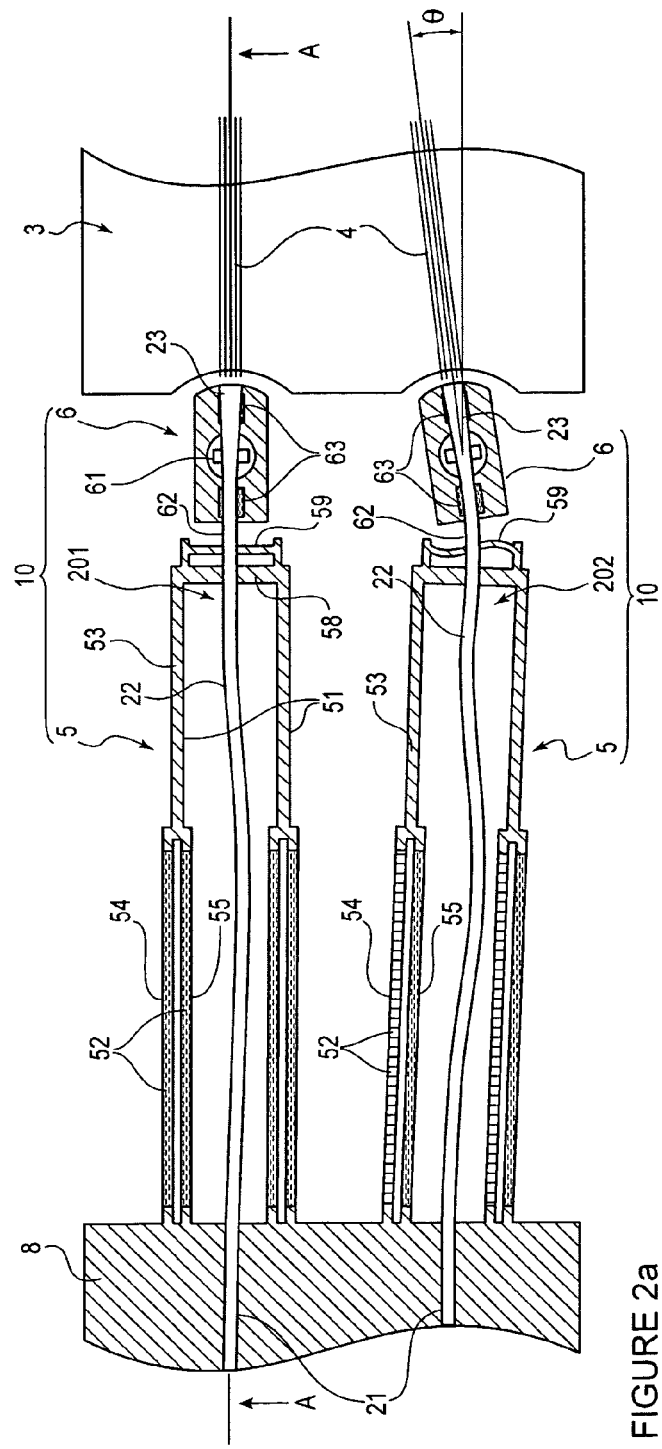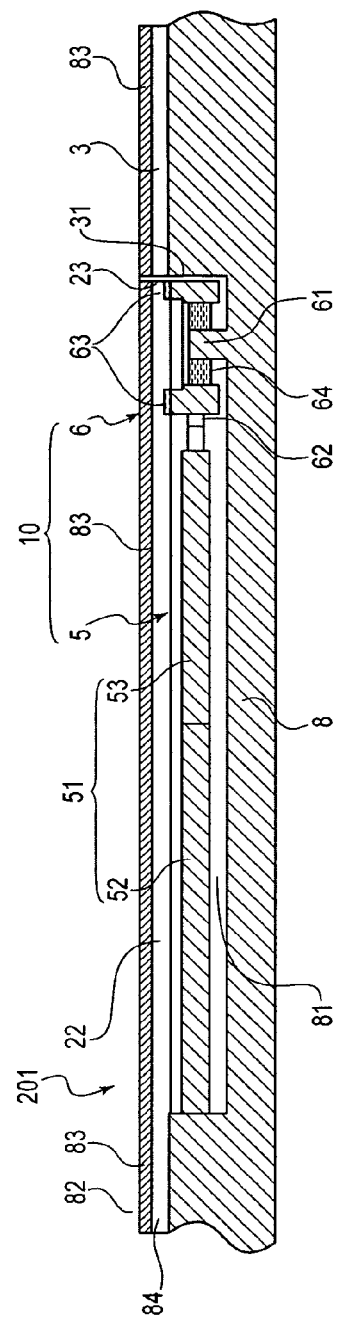
FIGURE 2a
FIGURE 2b

OPTICAL CROSS-CONNECT SWITCH

The present invention relates to an optical cross-connect switch. It specifically relates to an optical cross-connect switch that allows to change the routing of optical signal beams in fiber-optic cable communication systems. More particularly, the invention relates to an integrated optical cross-connect switch comprising a micromechanical steering device on a substrate with a patterned waveguide layer. The invention further relates to an optical cross-connect switch designed to exchange optical signal beams across a switching plane between incoming and outgoing ports.

BACKGROUND OF THE INVENTION

According to Jerry D. Gibson, THE COMMUNICATIONS HANDBOOK, CRC PRESS, Boca Raton 1997, chapter 37, pages 513–528 the migration of photonics into switching is occurring in a variety of ways. This is happening because of the large variety of switching tasks to be performed in a modern communication network. The different switching tasks range from ensuring that major trunks have the ability to be switched from one route to another when a catastrophic accident destroys a route, to the real-time switching on a per call basis. A fiber optic communication network is operating at data rates from a few megabit per second up to 2.5 Gb/s and beyond. At the 2.5 Gb/s rate, several thousand digitized voice channels, each operating at 64 kb/s, can be transmitted along a single fiber using time-division multiplexing. In reconfigurable optical networks, optical cross-connect switches or switching fabrics, which are controlled by a network management system, are used to adapt the communication system dynamically to high capacity demands that vary in time.

In the event of a failure the entire multiplexed signal of a failed link, connecting a first and second switching station within a network, may automatically be switched to a protection fiber. The multiplexed signal may also be routed via an optical cross-connect switch of a third switching station in order to increase channel capacity or to reroute traffic of a broken link.

Optical cross-connect switches, which are described for example in U.S. Pat. No. 6,002,818, are therefore used to provide switchable cross-connects between optical fibers. One such cross-connect switch comprises piezoelectric lateral actuators for the optical fibers. The switching is accomplished therein by using a piezoelectric actuator which laterally translates the input fiber relative to the axis of a first collimation lens, thereby enabling the optical beam to be steered to a second collimation lens where another piezoelectric actuator has translated the end of an outgoing fiber into the location where it receives the optical beam. In this technique of steering optical fibers, steering units are required at the input fibers and output fibers. Besides being costly, the physical size of these beam-steering units affects the overall size of the optical crossbar. Another cross-connect switch comprises a beam-steering unit with rotating prisms to provide beam deflection from a transmitter side to a receiver side.

Optical communication initially was proposed to be based on the idea of switching optical signals from a selectable one of a plurality of incoming fibers to a selectable one of a plurality of outgoing fibers by orienting the end of the selected incoming fiber relative to a lens thereby providing a radiation beam of variable direction. An example therefore is disclosed in U.S. Pat. No. 4,512,036. Therein the free end of an optical fiber is moved by a piezoelectric bender element. That free end provides a beam of electromagnetic radiation which either impinges on a freestanding lens or on a lens that is mounted at the free end of the bender element.

Optical steering units comprising rotating prisms or further optical elements are hence known which direct an optical signal, emanating from an incoming optical fiber, towards an outgoing optical fiber. Switching of the optical signals in such devices is therefore performed in free-space.

An optical cross-connect switch designed to switch optical beams in free-space is described in WO 00/79311. This optical switch comprises, mounted on a base, at least one controllable actuator for positioning an optical element to guide an optical signal on a selected free-space switching path, within an optical path plane parallel to the base, from an input optical fiber to an output optical fiber. The optical beam can be directed in free-space by means of diffractive, refractive or reflective optical elements. By using microelectromechanical systems (MEMS) for actuating the optical elements the optical cross-connect switch can be made in reduced size.

Micromechanical structures are the basis of microactuators that are developed for the application in several technical fields, particularly for optical systems. Microactuators operating based on thermal effects are described in J. Micromech. Microeng., 10 (2000) 260–264. Electrostatic microactuators are described in WO 99/37013. Piezoelectric microactuators are described in U.S. Pat. No. 4,512,036. Microactuators operating based on the generation of surface acoustic waves are described in JP 10-327590.

A further cross-connect switch using reflective optical elements for redirecting an optical beam is described in U.S. Pat. No. 6,144,781. In this system a reflective optical element is disposed at the intersection of a first and a second light beam emanating from a corresponding first and second input in such a way that the light beams are directed to a first or a second output respectively.

When placing diffractive, refractive or reflective optical elements in free-space within an optical cross-connect switch in order to redirect an optical beam, several aspects require consideration.

First of all the production, mounting and alignment of the optical elements involve considerable costs. Production of optoelectronic integrated circuits (OEICs) incorporating the optical elements creates further problems since the relatively large size of optical elements further requires a corresponding size of the free-space switching region resulting in a comparably large dimension of the optical cross-connect switch. Transferring an optical beam through several optical elements may in addition cause transmission losses.

It would therefore be desirable to improve the described optical cross-connect switches.

It would be desirable in particular to provide an optical cross-connect switch that can be produced at reduced cost.

More particularly it would be desirable to create an optical cross-connect switch that can be realized as an optoelectronic integrated circuit, using a process of comparably low complexity.

It would further be desirable to create an optical cross-connect switch incorporating a reduced number of externally produced optical elements in order to further reduce costs and to avoid transmission losses.

It would be desirable in particular to provide an optical cross-connect switch of smaller size thereby allowing the connection of an increased number of optical fibers for switching purposes.

SUMMARY OF THE INVENTION

The above and other objects of the present invention are achieved by an optical cross-connect switch according to claim 1.

The invention is related to an optical cross-connect switch comprising a waveguide connected with one waveguide end to a first optical port and connected with its other waveguide end to a steering device for directing an optical signal beam from said first optical port to a second optical port, said waveguide comprising a patterned waveguide layer disposed on a substrate.

This arrangement has the advantage that it is as a whole manufacturable by a lithographic process. It does not need a separate fiber to be combined, and hence aligned, with the steering part of the switch. Here the substrate and the waveguide can be patterned in one common process. This simplifies the manufacturing. It further avoids the necessity of alignment.

The ports indicate locations where the optical signal beams enter the optical cross-connect switch and not a special embodiment of the entry points or the means by which the optical signal beams enter the optical cross-connect switch. A port may therefore be a unit in which optical waveguides are coupled or a location where optical signal beams are entering the optical cross-connect switch e.g. by means of a waveguide which is coupled to an external device. In this case the location of the port could be defined as the output port of the external device.

The steering device can be arranged in a cavity in the substrate. The optical cross-connect switch then comprises a substrate, which is partially covered by a waveguide layer and a cladding layer, patterned for example by etching processes, with at least one waveguide, connected with one end to one of the optical ports and with the other end, comprising core and cladding, unsupported by the substrate or remaining layers and extending into a switching plane above the cavity, which is located in the substrate. In the cavity the steering device is arranged, designed to direct the free waveguide end in a selectable direction within the switching plane towards an optical element, such as a free end of a further waveguide, designed to receive or send optical signal beams.

The optical cross-connect switch can be used to construct large switching fabrics with numerous peripheral optical ports or small switching units within an optoelectronic comprising for example only three or two internal optical ports that are connected for example to communication modules of the optoelectronic integrated circuit.

The optical cross-connect switch preferably comprises a slab waveguide module positioned within the switching plane in order to transfer the optical signal beams between a waveguide connected to the first set of optical ports and a waveguide of the second set of optical ports. The slab waveguide module provides for a guiding of the optical signal beam that is laterally less constraint than vertically.

The steering device preferably comprises a head element, which is pivotally supported by an anchor and which holds a corresponding free waveguide end in such a way that the head element can be rotated by means of an actuator thus directing the free waveguide end in a selectable direction within the switching plane.

The head element is preferably connected to the actuator and to the anchor by means of elastic beams which support rotation of the head element around an axis that is aligned substantially perpendicular to the switching plane thus keeping the free waveguide end in every direction angle stabilized within the switching plane.

In a further embodiment the head element is connected to the actuator by means of the free waveguide end which is elastically suspended on the front end of the actuator. This embodiment allows the fabrication of the head element and the actuator independently from each other.

The actuator is designed to rotate the head element with forces generated by means of a piezoelectric, electrostatic, acoustic or thermal effect.

Preferably the actuator is a thermally controlled cantilever arranged approximately in parallel to a free waveguide end. The actuator has one or two arms, each comprising several actuating beams arranged substantially in parallel, connected to each other at their ends and arranged adjacent to heater elements for individually heating and thus asymmetrically expanding the actuating beams in order to generate a lateral movement at the front end of the actuator and consequently a rotation of the connected head element relative to the supporting anchor.

The solution allows to fabricate the elements of the steering device including the interconnecting beams in one piece respectively from the same substrate by use of micro-machining technology. Cross-connect switches can therefore be fabricated at reduced cost with high packing density.

BRIEF DESCRIPTION OF THE DRAWINGS

Some of the objects and advantages of the present invention have been stated, others will appear when the following description is considered together with the accompanying drawings, in which:

FIG. 2a shows a more detailed view of two of the waveguide steering devices of the optical cross-connect switch shown in FIG. 1;

FIG. 2b shows a side elevation of a cut along line A—A in FIG. 2a;

All the figures are for sake of clarity not shown in real dimensions, nor are the relations between the dimensions shown in a realistic scale.

DETAILED DESCRIPTION OF THE PREFERRED EMBODIMENTS

Figure 1:
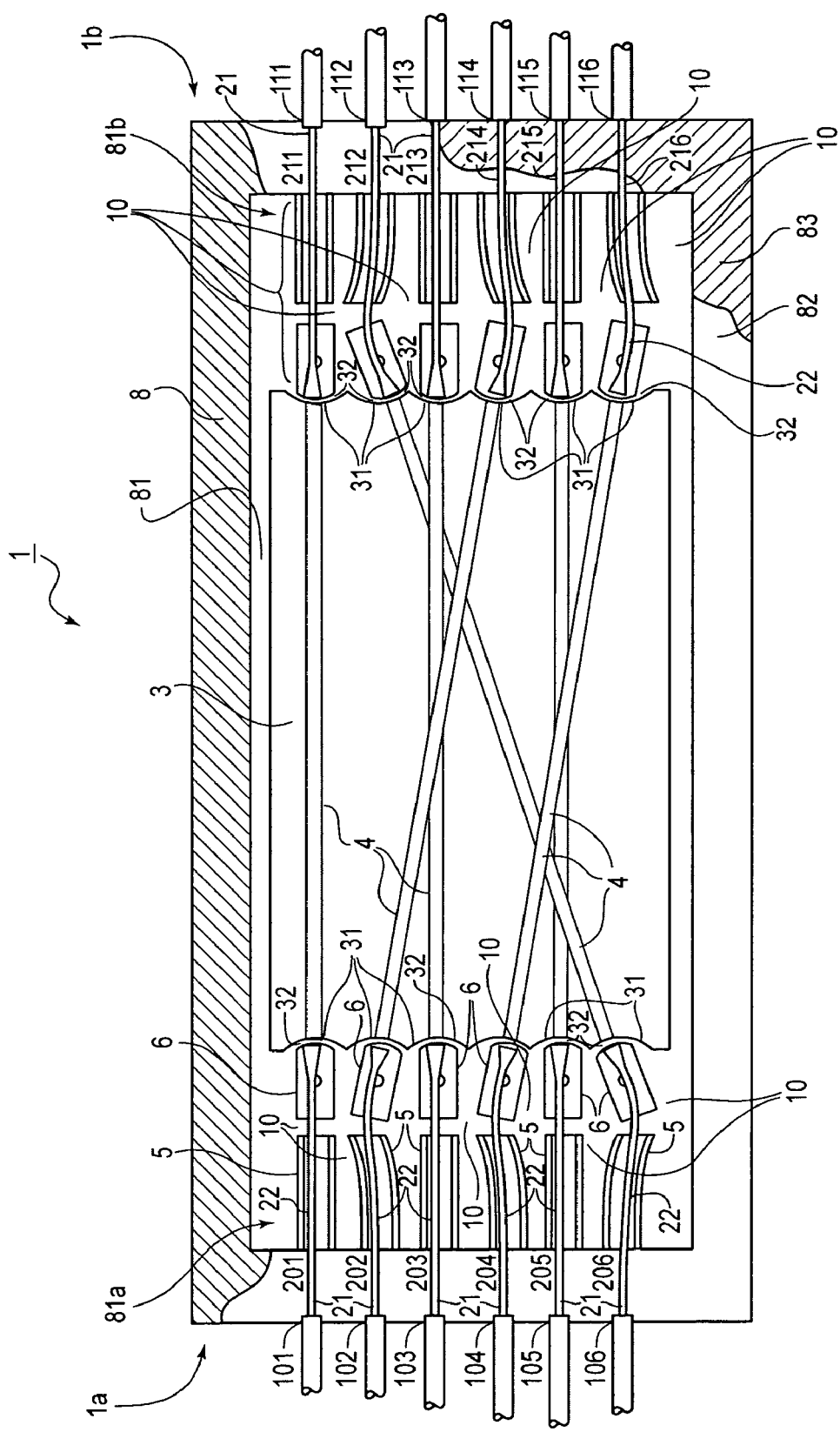
FIG. 1 shows a sectional view of an optical cross-connect switch with a first and a second set of waveguides arranged with their free waveguide ends aligned by means of waveguide steering devices on opposite sides of a slab waveguide module.

FIG. 1 shows a sectional view of an optical cross-connect switch 1 comprising a substrate 8 bearing a frame 82 and a first set of waveguides 201, 202, 203, 204, 205, 206. The substrate 8 has a sheetlike form, i.e. is essentially planar, which means that it has a substrate plane whose extension in both plane dimensions is larger than the substrate thickness. The switch 1 further comprises a first set of optical ports 101, 102, 103, 104, 105, 106 at a first end 1a of the substrate 8. Each of the waveguides 201, 202, 203, 204, 205, 206 is connected with a first waveguide end 21 to one of the optical ports 101, 102, 103, 104, 105, 106. The frame 82 comprises a waveguide layer 84 exhibiting a preferential mode-propagation direction in a plane parallel to or identical with the substrate plane. The frame 82 further comprises on the waveguide layer 84 on its side opposite the substrate 8, a cladding layer 83.

The frame 82 is here unified with the first waveguide ends 21. More precisely the first waveguide ends 21 and the frame 82 are of unitary construction. Hence the first waveguide ends 21 are also disposed on the substrate 8, which makes the first waveguide ends 21 to fixed waveguide ends 21. The waveguide layer 84 and the cladding layer 83 are patterned to form the fixed waveguide ends 21. In particular, the waveguide layer 84 is patterned to comprise for each of the waveguides 201–206 a ridge that forms a respective waveguide core. In the manufacturing step for the cladding layer 83, the cladding layer 83 is automatically patterned by depositing it on the patterned waveguide layer 84 thereby forming over each waveguide core ridge a cladding ridge with inclined sidewalls. This means that the fixed waveguide ends 21 here comprise a patterned part of the waveguide layer 84 and cladding layer 83.

The opposite waveguide ends 22 of the waveguides 201–206, extend partially across a first cavity 81a in the substrate 8. Since these opposite waveguide ends 22 are standing unsupported and free with respect to the substrate 8 they are also referred to as free waveguide ends 22. The free waveguide ends 22 and the fixed waveguide ends 21 are of unitary construction. This can be achieved by manufacturing them from a common source structure, preferably in a common process step. Here the source structure can be the waveguide layer 84 with the waveguide core ridge and the cladding layer 83 with the cladding ridge. By removing the corresponding parts of the waveguide layer 84 and cladding layer 83, namely the regions beneath the ridge, the remaining structure, comprising the waveguide core with the corresponding cladding, represent the waveguides 201–206 comprising the patterned waveguide layer 84 and cladding layer 83, lying with their fixed waveguide ends 21 on the substrate 8.

A manufacturing process step sequence for manufacturing the above described structure would hence be to provide the substrate 8, deposit thereon the patterned waveguide layer 84, deposit thereon the cladding layer 83, remove these two layers in the area around the free waveguide ends 22 and above the first cavity 81, then creating the first cavity 81 by removing the substrate 8 in that area.

For each of the free waveguide ends 22 of the first set of waveguides 201–206, in the first cavity 81 a steering device 10 is arranged for directing the respective free waveguide end 22 in a selectable direction within a switching plane, that is preferably identical with or parallel to the plane of the substrate 8.

On the end opposite the first end 1a, referred to as opposite end 1b of the substrate 8, is disposed a second set of waveguides 211, 212, 213, 214, 215, 216 and a second set of optical ports 111, 112, 113, 114, 115, 116. Each of the waveguides 211, 212, 213, 214, 215, 216 is connected with a first waveguide end 21 to one of the optical ports 111, 112, 113, 114, 115, 116. The opposite waveguide ends 22 of the waveguides 211–216, extend partially across a second cavity 81b above the substrate 8 within the frame 82. For each of the free waveguide ends 22 of the second set of waveguides 211–216, in the second cavity 81b a steering device 10 is disposed for directing the respective free waveguide end 22 in a selectable direction within the switching plane. The arrangement of the switch 1 is here symmetric along the line separating the one end 1a and the opposite end 1b of the switch 1.

By changing the direction of the free waveguide end 22 of one waveguide of the first set of waveguides 211–216, an optical signal beam 4 guided in that waveguide can be directed towards an optical element designed to receive that optical signal beam 4, such as here the free end 22 of one waveguide of the second set of waveguides 211–216 at the opposite end 1b of the optical cross-connect switch 1.

The steering device 10 comprises an actuator 5 and a head element 6. The end of the free waveguide end 22 that is remote from the substrate 8 and extending partially across the first cavity 81a is hereinafter referred to as remote waveguide end. The actuator 5 is here a longitudinal element that is disposed along some part of the length of the free waveguide end 22 and is designed to be able to provide for a lateral force on the free waveguide end 22 with respect to the fixed waveguide end 21. More precisely the actuator 5 extends from the substrate 8 into the first cavity 81a along some part of the length of the free waveguide end 22.

The head element 6 is arranged at the remote waveguide end and is rotatable for changing the direction of the corresponding free waveguide end 22, i.e. the direction of the optical signal beam 4 emanating from the remote waveguide end. The free waveguide end 22, respectively the remote waveguide end thereof, is preferably preshaped such that it is compliant to flexure and/or torque applied by the steering device 10, and prevented from retraction in case that the direction is changed. Such a shape would for example be an S-shape.

For changing the beam direction at the free waveguide end 22, the actuator 5 provides for a lateral force and hence a lateral shift of the remote waveguide end of the free waveguide end 22. That lateral shift is translated by means of the head element 6 into a swiveling of the remote waveguide end, which has the effect of a corresponding swiveling of the beam direction.

The optical cross-connect switch 1 further comprises a slab waveguide module 3 that is arranged between the first cavity 81a and the second cavity 81b. The slab waveguide module 3 is designed to guide the one or more optical signal beams 4 between the free waveguide ends 22 of the waveguides of the first set of waveguides 201–206 and the waveguides of the second set of waveguides 211–216. Between the slab waveguide module 3 and each of the free waveguide ends 22 a gap 32 exists. The slab waveguide module 3 preferably also comprises a part of the waveguide layer 84 and the cladding layer 83 on the substrate 8, and can therefore easily be fabricated by removing a corresponding section from the waveguide layer 84 and the cladding layer 83. This then means that the slab waveguide module 3 and the waveguides 201–206 are of uniform construction. Automatically, by having been formed from the same waveguide layer 84 and cladding layer 83, the slab waveguide module 3 and the waveguides 201–206 lie in a common plane which plane is identical or parallel to the switching plane. In this case the waveguides 201–206 and the slab waveguide module 3 are fabricatable in a single patterning process. Such patterning process can be e.g. a lithographic process, involving photoresist-deposition, masking, illumination, and etching. The manufacturing sequence described above automatically creates the slab waveguide module 3 by leaving the substrate 8 with the waveguide layer 84 and the cladding layer 83 in the area outside of the cavities 81a, 81b.

The steering device 10 is located between the waveguide layer 84 and the substrate 8. This means that the cavities 81a, 81b extend into the substrate 8 and that the slab waveguide module 3 not only comprises a patterned part of the waveguide layer 84 and cladding layer 83, but also the corresponding patterned part of the substrate 8.

The structure and functionality of the optical cross-connect switch 1 is preferably symmetric. In order to transfer the optical signal beams 4 from the first set of waveguides 201–206 to the second set of waveguides 211–216, the corresponding opposite free waveguide ends 22 are aligned towards each other by means of the corresponding steering devices 10, which here are identical in their design to the steering devices 10 for the first set of waveguides 201–206.

One such optical signal beam 4 can be transmitted between the free waveguide end 22 of one waveguide of the first set of waveguides 201–206 and the free waveguide end 22 of one waveguide of the second set of waveguides 211–216 through free-space and/or through the slab waveguide module 3.

In order to keep the coupling properties between the waveguides 211–216 and the slab waveguide module 3 substantially constant over the range of different directions of the free waveguide end 22, the slab waveguide module 3 comprises adjacent to each remote waveguide end an adaptation section 31 which is curved in such a way that the gap 32 between the slab waveguide module 3 and the respective free waveguide end 22 is substantially constant for several selectable directions.

The optical cross-connect switch 1 hence allows the selectable transfer of the optical signal beams 4 between the free waveguide ends 22 of the first set of waveguides 201–206 and the free waveguide ends 22 of the second set of waveguides 211–216 through the slab waveguide module 3 that acts as a coupler element.

The directional steering of the free waveguide end 22 can be performed with a micro-electromechanical-system, which here is the steering device 10. The steering device 10 comprises the head element 6 designed to hold and rotate the corresponding remote waveguide end relative to an axis aligned substantially perpendicular to the switching plane. A rotation of the head element 6 in order to establish a selected signal beam path within the switching plane is performed by an electromechanical actuator, which here is the actuator 5.

The frame 82 can serve for coupling the waveguides 201–206 to the optical ports 101–106 which can be optical fiber ends. Therefore the frame 82 can e.g. be structured to have grooves, e.g. V-grooves for receiving and aligning the optical ports 101–106. This function can also be achieved by other means. Hence the frame 82 is not essential for the functionality of the switch 1.

FIG. 2a shows two of the waveguide steering devices 10 of the optical cross-connect switch 1 of FIG. 1. FIG. 2b shows a cut view along the line A—A in FIG. 2a.

One of the steering devices 10, here referred to as the first steering device 10, holds the free waveguide end 22 of a first waveguide 201 and one of the steering devices 10, here referred to as the second steering device 10, holds the free waveguide end 22 of a second waveguide 202.

Each of the steering devices 10 comprises the head element 6, which is pivotally supported by an anchor 61 and which holds the free waveguide end 22 at its end remote from the frame 82. It further comprises the elongated actuator 5 having two ends, one fixed end and one free end.

The actuator 5 is thermally driven. It is arranged substantially parallel to the corresponding free waveguide end 22 and is equipped with two arms 51, each comprising two parallel actuation beams 52 in line with lever elements 53 that are connected to each other at their ends by means of a yoke 58 which holds a yoke beam 59. The actuation beams 52 which at the fixed end of the actuator 5 emanate from the substrate 8, carry electrically resistive heaters 54, 55 for individually heating and thus asymmetrically expanding the actuation beams 52 in order to generate a lateral movement at the free end of the actuator 5 and consequently a rotation of the connected head element 6 relative to the anchor 61. For effecting the asymmetrical expansion of the actuation beams 52, also only one of the actuation beams 52 can be equipped with the heater 54.

The lateral movement of the free end of the actuator 5 hence causes a rotational movement of the head element 6, turning the remote waveguide end of the attached free waveguide end 22 into a desired direction. The remote waveguide end of the first waveguide 201 is at least laterally fixed at the head element 6 by means of spacers 63, wherein "lateral" is meant in a direction within the switching plane, substantially perpendicular to the beam direction.

At each remote waveguide end, here a terminating mode converter 23 is arranged, for collimating the outgoing beam of the respective optical signal beam 4 in horizontal and/or vertical direction. The terminating mode converter 23 has here a convex end surface that has substantially the same radius as the corresponding opposite surface of the slab waveguide module 3. The mode converter 23 is designed to create an expanded beam within the gap 32 between the free waveguide end 22 and the slab waveguide module 3 thus optimizing the coupling efficiency therebetween but also preventing beam divergence in the slab waveguide region. The mode converter 23 which could comprise a gradually enlarged element of the free waveguide end 22 acts as a collimating element focusing the emitted beam. Here, also the head element 6 is shaped in a similar form at its end that is closer to the slab waveguide module 3.

A small lateral movement of the actuator 5 results in a relatively large deflection of the free waveguide end 22 being translated into a corresponding big angle change of the corresponding beam direction. Such a steering device 10 and hence the whole optical cross-connect switch 1 can hence be realized in small dimensions, nevertheless allowing a relatively broad selection of possible beam directions.

The actuation of the first steering device 10 holding the first waveguide 201 is depicted in FIG. 2a in an off-state. The actuation of the second waveguide steering device 10 holding the second waveguide 202 is in contrast depicted in an on-state, resulting in the guidance of the corresponding optical beam 4 through the corresponding turned remote waveguide end at an angle Q towards a receiving waveguide, e.g. the waveguide 214 as shown in FIG. 1.

The actuation of the steering device 10 holding the second waveguide 202 is effected by heating and thereby thermally expanding the beams 54 on one side of each arm 51 more than the beams 55 on the other side of each arm 51. This results in a lateral movement of the front end of the arms 51 and of the yoke 58 and a corresponding turn of the head element 6 and the remote waveguide end of the corresponding steered waveguide end 22. Heating and thermally expanding the other beams 55 more than the corresponding beams 54 would result in a lateral movement of the front end of the arms 51 in the opposite direction. The thermally driven actuators 5 can be used for creating large displacements of the yokes 85 and hence the remote waveguide ends with high forces. They can be based on the thermal expansion of two different materials (bimaterial actuators) or of two coupled beams of an actuator arm at different temperatures. The disadvantage of coupled linear and angular movement is overcome by coupling two of these arms.

The actuator 5 is at its fixed end supported by the substrate 8. The anchor 61 is realized as a protrusion on the substrate 8. The free waveguide end 22 hence runs along substantially the same direction as the actuator 5, above the same with respect to the substrate 8 and is held at its remote waveguide end by the head element 6.

The process for manufacturing the switch 1 including the steering devices 10 would include a step of manufacturing the steering device 10 by structuring the substrate 8 in the cavity 81*a*, 81*b* to thereafter have the steering device 10. In that case the steering device 10 and the substrate 8 would be of uniform construction. This would not include the heaters 54, 55 since these would be made of a different material, as stated above. The heaters 54, 55 would hence be arranged after having created the underlying structure of the steering device 10 that comprises the substrate material. The structuring of the substrate 8 to form the steering device 10 without the heaters 54, 55 can be done by lithographic process steps. It is also possible to produce the steering device 10 separately and then assemble it into the cavity 81, 81*b* in the substrate 8. Also a combination of such assembly with parts of the steering device 10 having been manufactured directly within the cavity 81, 81*b* from the substrate 8, e.g. the anchor 61, can be made.

Figure 3:
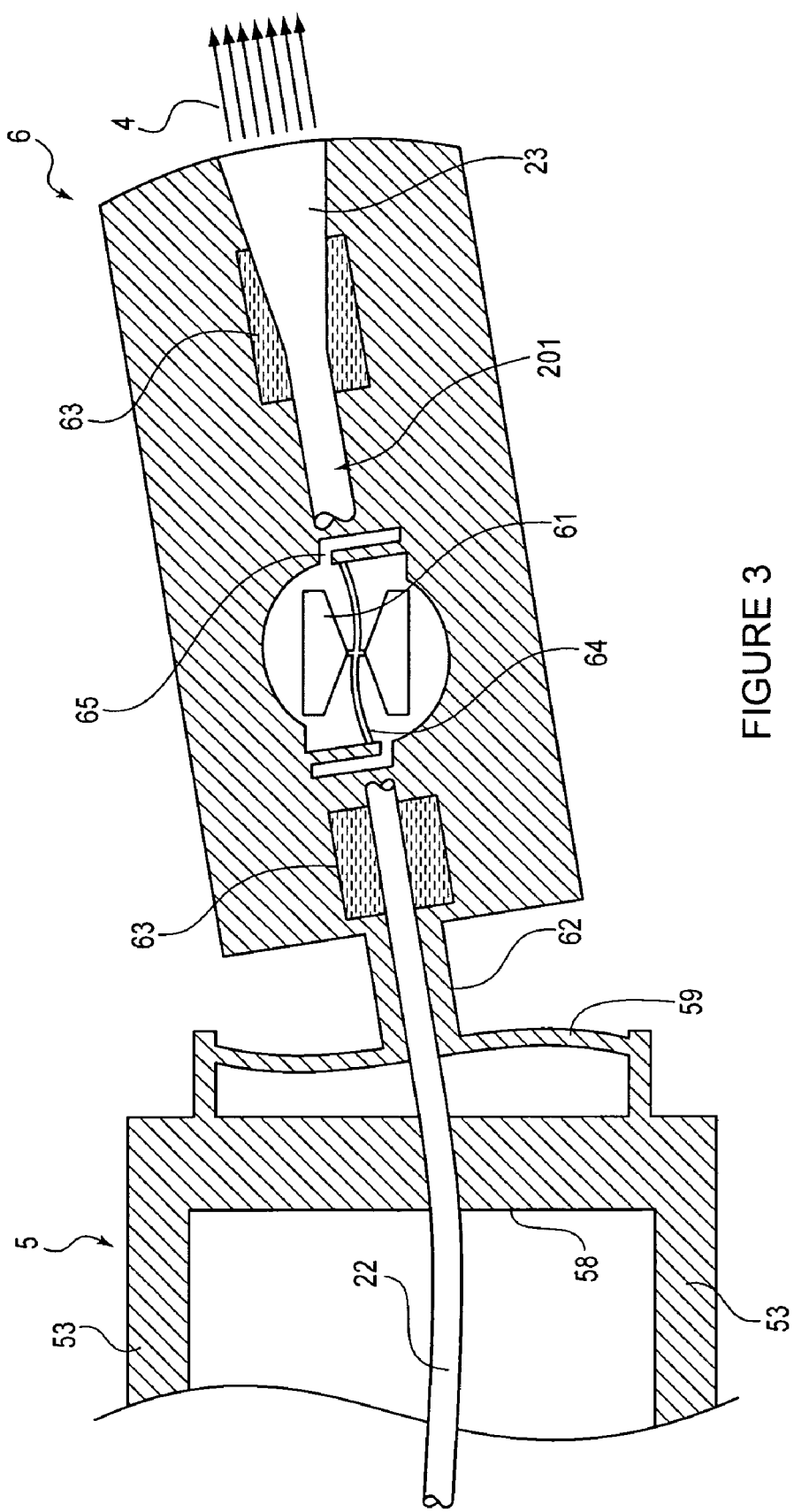
FIG. 3 shows a more detailed view of a head element of a waveguide steering device.

FIG. 3 shows a more detailed view of the anchored head element 6 of the second waveguide steering device 10 shown in FIG. 2*a*.

The waveguide steering device 10 comprises the head element 6 which by means of elastic primary beams 64 and secondary beams 65 is connected to the anchor 61. The anchor 61, which may comprise one or more elements, acts as a pivot-bearing allowing the head element 6 to rotate around the point where the primary beams 64 are connected to the anchor 61.

The steering device 10 further comprises the actuator 5 with a front end comprising the elastic yoke beam 59, which by means of the further beam or rod 62 is connected to the head element 6. The elastic yoke beam 59 is attached to the yoke 58 and provides for a fixation of the head element 6 to the actuator 5 that keeps the remote waveguide end of the free waveguide end 22 tiltable with respect to its longitudinal extension.

The elements of the steering device 10 can be at least partially fabricated in one piece on the substrate 8 being a bulk substrate, by means of micro-fabrication. The optical cross-connect switch 1 can therefore be realized for example in an optoelectronic integrated circuit without insertion of externally manufactured optical elements such as mirrors or lenses.

Figure 4:
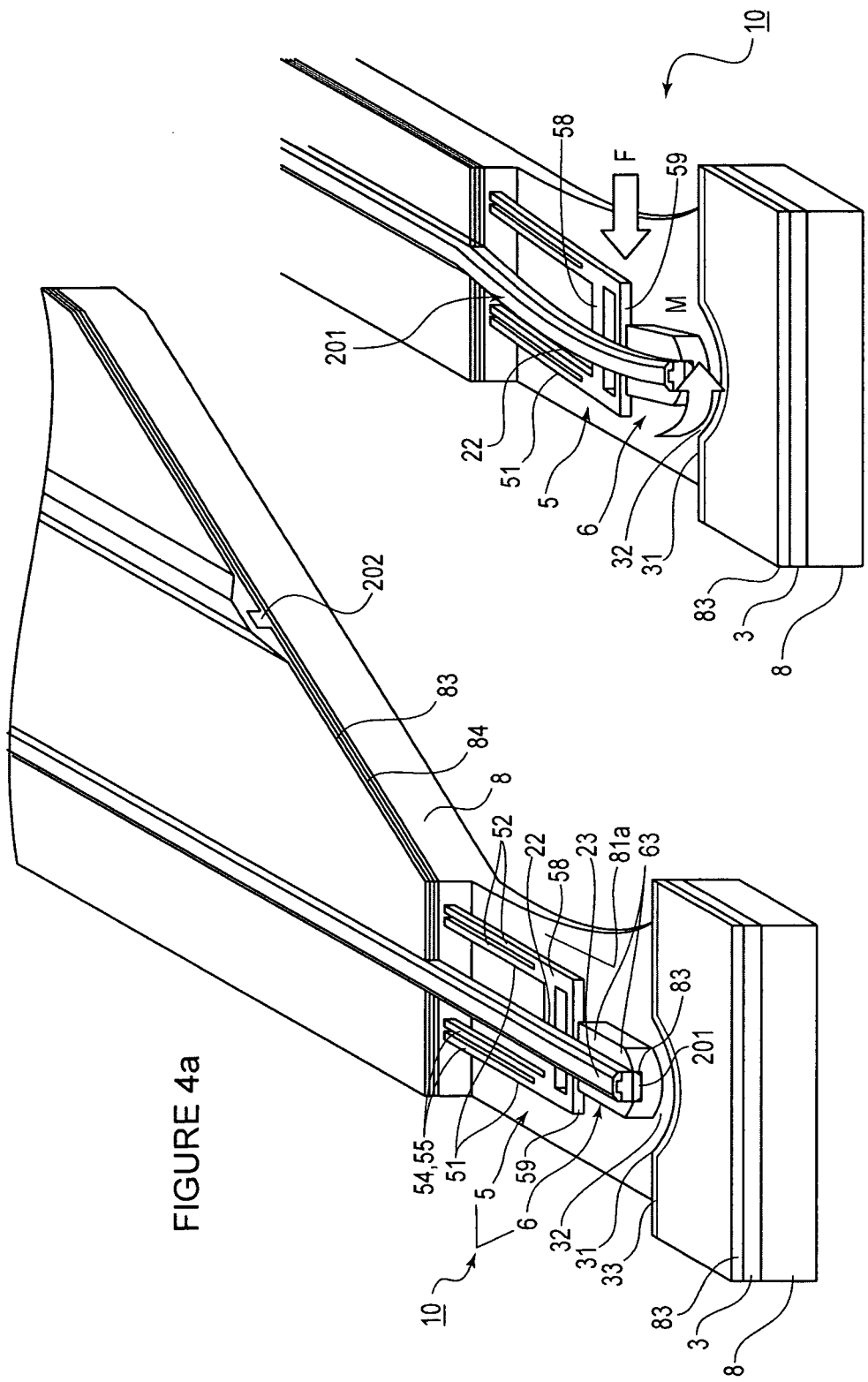
FIG. 4a shows a three-dimensional view of a part of an optical cross-connect switch embedded in a layered optoelectronic integrated circuit with a free waveguide end pointing into a first direction.
FIG. 4b shows a three-dimensional view of the part of an optical cross-connect switch embedded in a layered optoelectronic integrated circuit with the free waveguide end pointing into a second direction.

FIG. 4*a* shows a three-dimensional view of a section of an optoelectronic integrated circuit comprising the switch 1 as described. From the patterned waveguide layer 84 and the patterned cladding layer 83 on the substrate 8 extend the two waveguides 201, 202. The substrate 8 comprises the first cavity 81*a* with the steering device 10 integrated therein which holds the free waveguide end 22 of the waveguide 201 fastened to its head element 6. The head element 6, which is rotatably mounted by means of the anchor 61 (not shown), is connected to the yoke beam 59 of the thermally driven actuator 5 which extends out of a section of the substrate 8, which section forms a sidewall of the first cavity 81*a*. On the two actuating beams 52 of each cantilever arm 51 the electrically resistive elements 54, 55 are arranged, usable for individually heating and thus asymmetrically expanding the actuating beams 52 in order to generate a lateral movement at the front end of the actuator 5 and consequently a rotation of the connected head element 6 relative to the anchor 61.

In FIG. 4*b* the same arrangement as in FIG. 4*a* is depicted, but here the free waveguide end 22 is deflected to change its output direction. The two actuating beams 52 of each cantilever arm 51 are asymmetrically expanded, thereby generating a lateral movement at the front end of the actuator 5 and consequently a rotation of the connected head element 6 relative to the anchor 61. A force F generated by the actuator 5 is applied to the pivotally supported head element 6, which transforms this force F into a corresponding rotational moment M to the remote waveguide end of the free waveguide end 22 of the first waveguide 201.

The gap 32 between the free waveguide end 22 and the adjacent adaptation section 31 of the slab waveguide module 3 is shown expanded.

The slab waveguide module 3 is an element that can be fabricated from the waveguide layer 84, the cladding layer 83 and the substrate 8. This slab waveguide module 3 has the functionality of a planar waveguide layer, i.e. has extensions in a plane parallel to or identical with the substrate plane or the switching plane, which here is the plane in which the various selectable directions of the optical signal beams 4 lie, which extensions are bigger than the thickness of the slab waveguide module 3. The slab waveguide module 3 thereby allows a transfer of the optical signal beam 4 that is laterally, i.e. in the switching plane, less constraint than in the planes perpendicular thereto.

However as mentioned before, the free waveguide end 22 could also be aligned with a further optical receiver such as another waveguide end which might be firmly aligned. In such a case or in a case where only a discrete set of signal beam paths is desired, the slab waveguide module 3 could be patterned accordingly. The optical cross-connect switch 1 could therefore be realized with the steering device 10 holding the free waveguide end 22 of the first waveguide 201 and e.g. two angularly offset fixed waveguide ends 22 located in opposition thereof.

Figure 5:
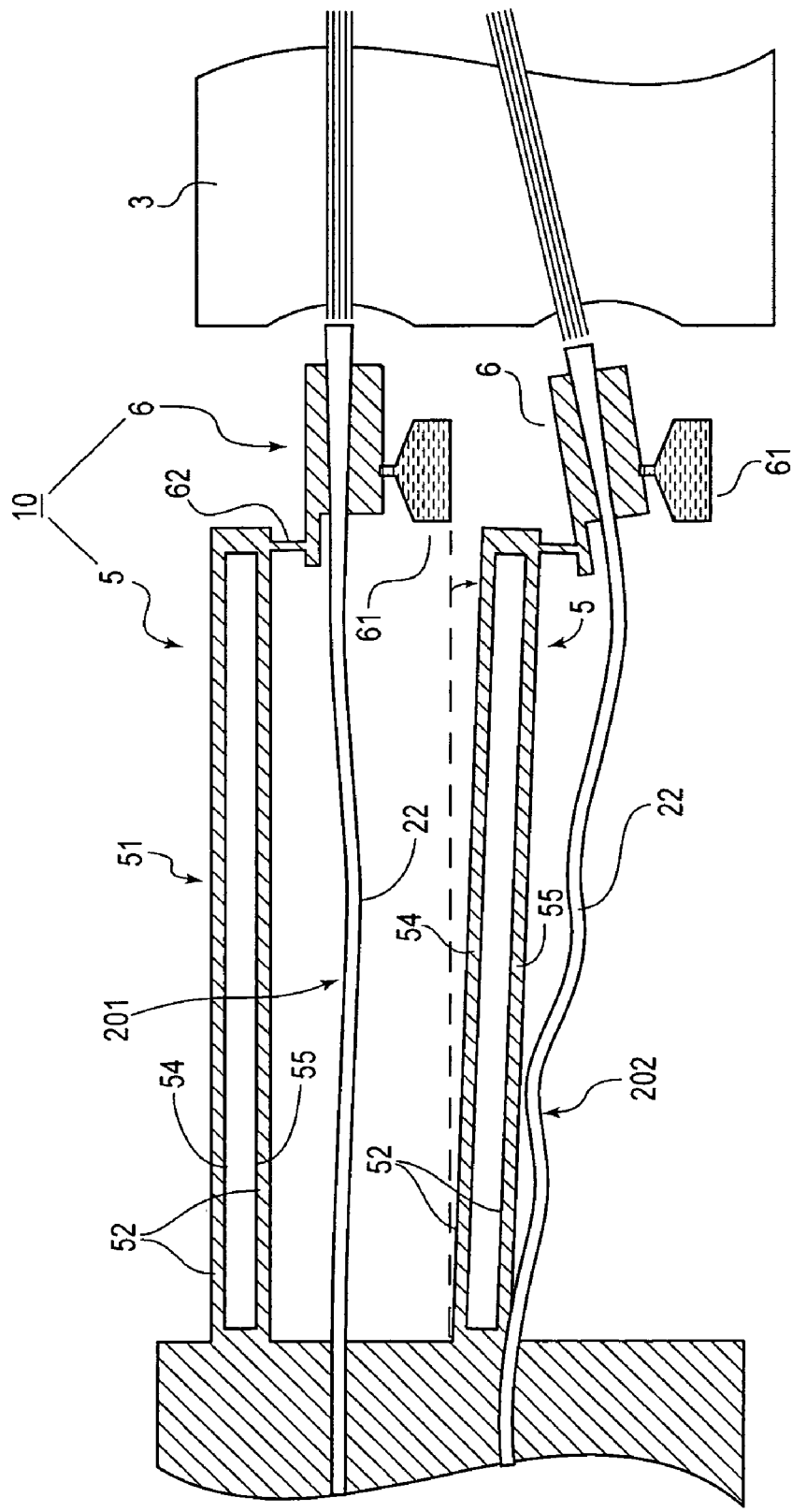
FIG. 5 shows a second embodiment with two waveguide steering devices.

FIG. 5 shows a second embodiment of the waveguide steering device 10. The waveguide steering device 10 pertaining to the first waveguide 201 is depicted in an off-state and comprises the actuator 5 with a single arm 51 which over an elastic beam 62 is connected to the head element 6 which is further connected to the anchor 61 acting as pivot bearing. The arm 51 comprises two actuation beams 52 with one heater 54, 55 on each of these actuation beams 52. The anchor 61 is arranged sideways to the arm 51 when viewed perpendicular to the switching plane, i.e. in direction of the axis of the anchor 61. The waveguide steering device 10 pertaining to the second waveguide 202 is depicted in an on-state, i.e. by deflection of the actuator 5 the head element 6 is turned around the fixing point provided by the anchor 61.

Figure 6:
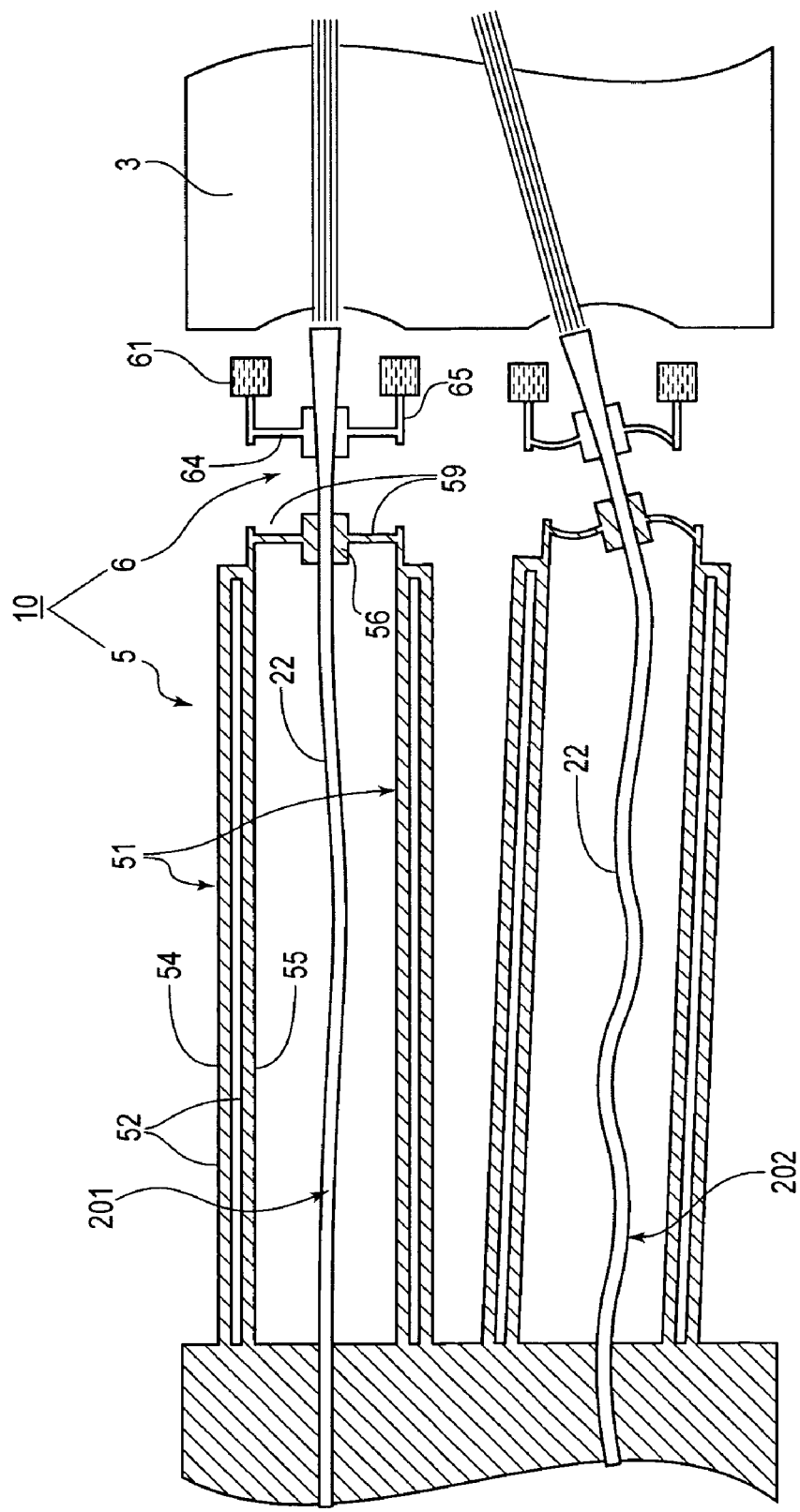
FIG. 6 shows a third embodiment with two waveguide steering devices.

The waveguide steering device 10 shown in FIG. 6 comprises the first waveguide 201 with the dual-arm cantilever actuator 5 and the head element 6, which are connected to one another by means of the attached waveguide end 22 of the corresponding first waveguide 201. Each arm 51 comprises the two actuation beams 52 with one heater 54, 55 on each of these actuation beams 52. The head element 6 is connected via the primary and secondary beams 64, 65 to elements of the anchor 61 acting as pivot bearing. The anchor 61 comprises here two anchor elements, one of them respectively being arranged to either side of the remote waveguide end and being fixed at the substrate 8 and being connected to each other via the primary and secondary beams 64, 65. The front ends of the actuator arms 51 are connected to a bearing element 56 by means of the yoke beams 59. The bearing element 56 and the head element 6 which are mechanically connected by means of the free waveguide end 22 are mutually aligned and rotated correspondingly whenever a lateral movement of the actuator arms 51 occurs, thus directing the free waveguide end 22 in a selected direction. The waveguide steering device 10 pertaining to the first waveguide 201 is depicted in an off-state. The waveguide steering device 10 pertaining to the second waveguide 202 is depicted in an on-state, i.e. by deflection of the actuator 5 the head element 6 is turned around the fixing point provided by the anchor 61.

The solution can also be applied in cross-connect systems comprising protection fibers that are assigned to a single fiber for protection purposes only. A protection fiber could therefore be aligned firmly towards an opposite waveguide end 22 which in case of a failure of the standard connection would be redirected towards the end 22 of the protection fiber.

A lower cladding layer can be arranged under the waveguide layer. Such lower cladding layer can e.g. comprise an oxide layer such as SiO2 on a silicon substrate 8. This lower cladding layer then provides for a more symmetrical mode form, facilitating coupling to other waveguides. All patterning steps that affect the waveguide layer 84 can be performed on the cladding layer 83 and the lower cladding layer as well, such that the final pattern is identical through all three layers.

The complete steering device 10 can be manufactured from the substrate 8, using microfabrication, nanostructuring or lithographic process steps. For such process steps it is of advantage if the layout of the steering device 10 is designed such that in a view perpendicular to the substrate plane, at least the arm or arms 51 are positioned lateral to the free waveguide end 22. Thereby, the arms 51 can be manufactured by exposing the substrate 8 to processing means, such as optical, liquid or gaseous means, directed substantially perpendicularly to the substrate plane. The structure depicted in FIG. 4a is such a structure. All parts of the steering device 10 that lie underneath the free waveguide end 22 can be manufactured by applying process steps in which the processing agents can reach the structure to be manufactured also underneath the free waveguide end 22. A possibility is also to apply process steps that reach the target location from underneath the substrate 8. Therefor openings that reach the cavity 81a, 81b from the underside of the substrate 8, i.e. from the side opposite the cavity 81, 81b, can be manufactured and used.

What has been described is merely illustrative of the application of the principles of the present invention. Other arrangements can be implemented by those skilled in the art without departing from the spirit and scope of protection of the present invention.

Any disclosed embodiment may be combined with one or several of the other embodiments shown and/or described. This is also possible for one or more features of the embodiments.

It is obvious that a person skilled in the art can modify the shown arrangements in many ways without departing from the gist of the invention which is encompassed by the subsequent claims.

The invention claimed is:

1. An optical cross-connect switch comprising a waveguide connected with one waveguide end to a first optical port and connected with the other waveguide end to a steering device for directing an optical signal beam from said first optical port to a second optical port, said waveguide comprising a patterned waveguide layer partially disposed on a substrate wherein the steering device comprises a rotatable head element at the other waveguide end for directing said optical signal beam in a selectable direction within a switching plane identical with or parallel to a plane of the substrate, the rotatable head element providing rotation of the head element about an axis substantially perpendicular to the switching plane.

2. The optical cross-connect switch according to claim 1, further comprising a slab waveguide module designed to guide the optical signal beam and comprising a patterned waveguide layer disposed on the substrate.

3. The optical cross-connect switch according to claim 1, wherein the waveguide layer is disposed adjacent a cladding layer.

4. The optical cross-connect switch according to claim 1, wherein the steering device is located in a cavity in the substrate.

5. The optical cross-connect switch according to claim 1, wherein the steering device and the substrate are substantially of unitary construction.

6. The optical cross-connect switch according to claim 1, wherein the head element is rotatable by means of an actuator.

7. The optical cross-connect switch according to claim 6, wherein the head element is connected to the actuator by means of one of an elastic beam and the other waveguide end.

8. The optical cross-connect switch according to claim 6, wherein the other waveguide end is elastically connected to the actuator.

9. The optical cross-connect switch according to claim 6, wherein the actuator is designed to provide a lateral shift of the other waveguide end.

10. The optical cross-connect switch according to claim 9, wherein the head element is designed to translate the lateral shift into a rotation of the other waveguide end around a rotation axis.

11. The optical cross-connect switch according to claim 6, wherein the actuator comprises several arms connected at one end to the substrate and connected at their other end to each other via a yoke that is connected to the head element via an elastic yoke beam.

12. The optical cross-connect switch according to claim 1, wherein the other waveguide end is preshaped to comply with one of flexure and torque of the steering device.

13. The optical cross-connect switch according to claim 1, wherein at the other waveguide end a mode converter is arranged for collimating the optical signal beam.

* * * * *